United States Patent [19]

Macauley, Jr.

[11] 3,997,434
[45] Dec. 14, 1976

[54] CONCRETE RECLAMATION SYSTEM

[75] Inventor: Irving P. Macauley, Jr., Clinton, Conn.

[73] Assignee: Jetomatic Systems, Inc., Guilford, Conn.

[22] Filed: Sept. 4, 1975

[21] Appl. No.: 610,330

[52] U.S. Cl. .................... 209/10; 209/250; 302/16; 259/164

[51] Int. Cl.² ............................................. B03B 7/00

[58] Field of Search ............ 209/2, 10, 17, 12, 18, 209/44, 155, 250, 172.5; 302/14, 16, 66; 259/164, 165, 154; 106/97

[56] References Cited

UNITED STATES PATENTS

| | | | |
|---|---|---|---|
| 3,278,022 | 10/1966 | Moeschler | 209/17 X |
| 3,596,759 | 8/1971 | King et al. | 209/2 |

*Primary Examiner*—Frank W. Lutter
*Assistant Examiner*—Ralph J. Hill
*Attorney, Agent, or Firm*—James J. Burke II

[57] ABSTRACT

A no-discharge concrete reclamation system that eliminates all waste products and associated pollution. In addition to separating and washing sand and aggregate as provided in conventional systems, the invention provides for holding the water-cement slurry in suspension while continuously circulating same with a transfer pump to a point near the batching plant. On demand, slurry for batching from the circulating stream is provided to the mixers. Preferably, clarified wash water is held separately and used to provide mixer wash water, and/or make-up water for the slurry.

15 Claims, 2 Drawing Figures

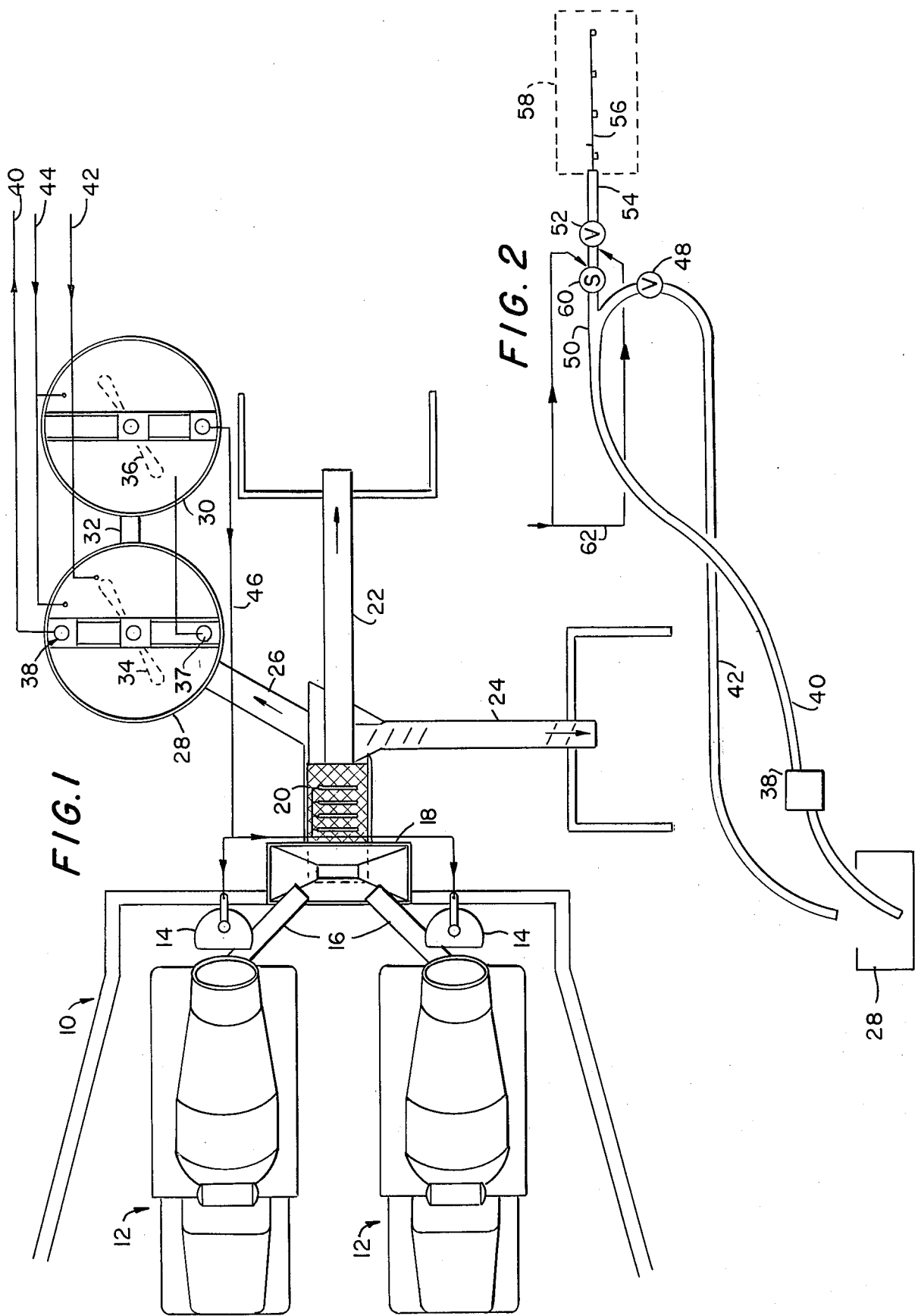

CONCRETE RECLAMATION SYSTEM

BACKGROUND OF THE INVENTION

The present invention relates in general to the reclamation of un-poured concrete and, more particularly, it relates to a closed system for such wastes wherein there are no unused products.

Many years ago, the construction of concrete structures was accomplished by mixing the individual ingredients — aggregate, sand, cement, and water — at the site, in a stationary mixer, then transferring it to a container and pouring it from the container into the forms. At the end of each day, or periodically during the day, the mixers and containers were flushed with water to prevent hardening of remnant concrete therein, the wash water and contained solids going down the nearest drain.

More recently, the stationary mixer has been replaced by the so-called "transit mix" truck, which is charged with the raw materials at a central plant, which mixes them into concrete while in transit, and discharges the product upon arrival at the site. Upon return from each delivery, each truck is flushed with water for the same reasons as stated above.

Still more recently, very large industrial plants have been constructed for the sole purpose of producing pre-cast concrete products, ranging from modest, residential-type concrete blocks to elaborate building-facing panels and structural elements. Again, every piece of equipment contacted by the wet concrete must be regularly flushed with water to prevent hardening thereof and consequent equipment breakdown.

Whether producers of concrete realized the economic value of what was being flushed down the drain, or whether they were forced to consider it by the threat of increasingly stringent water pollution laws and a lack of land-fill sites, is now moot. The fact is that attention has been paid to the problem. It is also considered that solutions proposed heretofore have been less than satisfactory, for a particular reason that will become apparent from consideration of what is deemed to be the most relevant prior art.

The following U.S. Pat. Nos. are, insofar as the present invention is concerned, quite similar, though they differ amongst themselves substantially: 2,942,731; 3,278,022; 3,596,759; and 3,695,427. All of these references are concerned with the reclamation of unpoured concrete. Generally, they disclose flushing the mixer or other equipment with water, separating from the resulting mixture sand and aggregate as separate fractions, and washing these fractions to remove cement and render them suitable for re-use. The thrust of each of these inventions is the particular means employed to separate, wash and recover the sand and the rock. There is little if any disclosure about what to do with what is left over, which is a slurry of cement and water. Two patentees disclose settling basins, and one of these suggests collection of the slurry for "disposal in any suitable manner." Another merely refers to it as "overflow."

The problem, in brief, is that under current environmental regulation conditions, there is no "suitable manner" for disposal of this slurry, whether or not it is thickened in a settling basin. It is considered likely that many concrete producers do use settling basins, and periodically clean out the collected muck and dump it "out in back."

OBJECTS OF THE INVENTION

It is a general object of the present invention to provide an improved system for the reclamation of concrete.

Another object of the present invention is to provide a concrete reclamation system that includes a recycle of the water-cement slurry.

A further object of the present invention is to provide a no-discharge concrete reclamation system.

Still another object of the invention is to provide means for the utilization of the water-cement slurry in the production of fresh concrete.

Various other objects and advantages of the invention will become clear from the following detailed description of the embodiments thereof, and the novel features will be particularly pointed out in connection with the appended claims.

THE DRAWINGS

Reference will hereinafter be made to the accompanying drawings, wherein:

FIG. 1 is a simplified, pictorial, plan view of a concrete truck cleaning station embodying the present invention; and FIG. 2 is a simplified, schematic piping diagram illustrating slurry recycle in accordance with the invention.

DESCRIPTION OF THE EMBODIMENTS

The present invention is based, in one part, on the realization that a thickened (i.e., settled) cement slurry is essentially useless; if it is to be at all useful, it must be kept agitated and not allowed to settle. The invention is further based on the realization that equipment handling such a slurry must be kept in substantially continuous operation lest it too become accreted with cement and plugged up. Lastly, the invention is based on the provision of means — described hereinbelow — whereby the continuous operation of a slurry recycling system can be adapted to interface with a concrete producing system, which is inherently a batch operation.

It is to be understood that the present invention is applicable to both the transit-mix and pre-cast type of concrete plants, necessary differences relating only to non-essential details. FIG. 1 illustrates the invention as it may be applied, in part, in a transit-mix plant, and attention is directed thereto.

A truck cleaning area 10 is provided with one or more bays for trucks 12 as needed. Each bay has wash-out jet sprays 14 which clean the truck, effluent passing out the truck's chute 16 into a hopper 18. The latter passes the effluent onto a plurality of screens or other separatory devices, indicated generally at 20, such as are disclosed in the above-noted prior art patents. The largest fraction, stone, is picked up in a conveyor 22 and taken to a first reclamation area, and the sand fraction is similarly conveyed as at 24 to a separate reclamation area. The last fraction, the water-cement slurry, flows by gravity through a chute 26 into a basin or tank 28. A second basin or tank 30, connected to tank 28 via a weir 32, may be provided.

It is noted that all of the above-described structure is known in the art and per se forms no part of the invention.

What is not conventional is the provision of agitators 34, 36 in tanks 28, 30, a slurry pump 38 and line 40 going to the batching facility (not shown in FIG. 1), return slurry line 42, and make-up water line 44 having outlets in each tank.

The function of agitators 34, 36 is as aforesaid, and operation of pump 38 and lines 40, 42 is discussed hereinbelow in connection with FIG. 2. The provision of second tank 30 is preferred, as it provides a local, closed-circuit source of wash-water for trucks 12 via line 46. As an alternative to agitator 36, it may be preferred to omit same and provide instead a feed-back loop in the form of limited-flow transfer pump 37 sucking relatively thick slurry off the bottom of quiescent tank 30 back into agitated tank 28.

The same system as described above is applicable to pre-cast plants, except that simpler means, e.g. sumps, may be used to separate sand and gravel portions.

As noted above, it is necessary to keep the slurry in motion if it is to be useful, and if it is not to accrete to transport equipment. Further, in modern cement plants the batches are charged very rapidly, and there would not be sufficient time to prime a slurry pumping system, bring it up to pressure, charge the slurry, shut it down, etc. For these reasons, the means shown in FIG. 2 is simplified, schematic form are employed, and attention is directed thereto.

It has been determined that in order to pump a slurry of the type described without accretions, even under conditions of continuous pumping, it is necessary to avoid sharp bends in the piping. Thus, pipes 40, 42 are pictured as forming a loop with bends of relatively large-radius curves and no sharp-angle bends. The required minimum radii must be determined for any particular installation, since particle sizes, slurry consistency, etc. will vary from plant to plant; it is sufficient herein to say there is an absence of sharp angle bends. The loop has a valve 48 at its far end (away from tank 28), and just ahead thereof there is a branch 50 including valve 52 communicating with line 54 which, in turn, connects to spray manifold 56 inside mixer 58, shown only in phantom.

In operation, pump 38 is on continuously, valve 52 is closed and valve 48 is open. In this mode, slurry is continuously pumped through lines 40 and 42 in a continuous loop. When mixer 58 is ready to receive slurry, the position of valves 48, 52 is reversed, the loop opened, and slurry is immediately passed into manifold 56 via conduit 54. As it does so, a metering sensor 60 in conduit 54 measures the volume of flow and at the proper moment, signals another reversal of valves 48, 52. Immediately prior thereto, however, sensor 60 also activates high pressure cleaning lines 62, so that the valve 52, the sensor and conduit 54 are flushed as this portion of the system is in part closed down and returned, in the other part, to the closed-loop mode. Lines 62 are preferably set up so as to both forward and backwash the critical area. Sensor 60 is located upstream of valve 52 in conduit 54 for maintaining it under a fluid pressure. The effect of the backwash is to create a pressurized water block between branch 50 and valve 52 when the system is in the circulating mode.

Make-up water in line 44 (FIG. 1) is provided to tanks 28, 30 as required, so that these sources can be used as the only in-plant source for both batching and washing water. The system thus provides a completely closed cycle, with no discharges of either solids or liquids. Operating expenses are minimal, requiring no more manpower than present installations, which are much less effective.

It will be appreciated that mixer 58 may be either stationary or a transit-mix truck. It will also be appreciated that the simplified description hereinabove set forth will have various valves and controls on cleaning lines 62, which may also be part of the high-pressure cleaning system used for the mixers and elsewhere. The system may, further, be either simpler or more complex, as long as the essential features are included. For example, sophisticated analog or digital control may be employed. Lastly, it will be appreciated that surfaces in contct with the slurry should be abrasion resistant. Various other changes in the details, steps, materials and arrangements of parts, which have been herein described and illustrated in order to explain the nature of the invention, may be made by those skilled in the art within the principle and scope of the invention, as defined in the appended claims.

What is claimed is:

1. In a method for the reclamation of unpoured concrete wherein concrete is separated into aggregate, sand and cement slurry fractions, the improvements comprising:
   maintaining said slurry in suspension in a vessel by agitation;
   circulating said slurry in a loop to a point near where concrete mixers are located and back into said vessel; and
   periodically opening said loop and supplying said slurry to said mixers as part of the charge to same.

2. The method as claimed in claim 1 wherein first and second cement slurry vessels are provided and additionally comprising overflowing slurry from said first vessel into said second vessel and utilizing partially clarified water from said second vessel as wash water for said mixers.

3. The method as claimed in claim 2, wherein pump means are provided between said first and second vessels, and additionally comprising pumping slurry from the bottom of said second vessel into said first vessel.

4. The method as claimed in claim 2, and additionally comprising supplying make-up water to said vessels.

5. The method as claimed in claim 1, wherein means for supplying said slurry to said mixers comprises:
   a branch in said loop near said mixers and having a conduit connected thereto;
   a first valve in said loop adjacent to and downstream from said branch;
   a second valve in said conduit near said branch;
   said conduit communicating with slurry discharge means within or adjacent said mixers;
   and additionally comprising:
   opening said first valve and closing said second valve to circulate said slurry; and
   reversing said valve positions to supply slurry to said mixers.

6. The method as claimed in claim 5, wherein flushing means are provided in said conduit, and additionally comprising flushing said conduit and discharge means after discharge of slurry to said mixers, and maintaining a water block between said branch and said second valve when said second valve is closed.

7. The method as claimed in claim 5 wherein sensor means are provided in said conduit, and additionally comprising metering the flow of slurry therethrough, and signaling reversal of said valves after a predetermined flow.

8. Apparatus for the reclamation and re-use of cement slurries comprising:

means for separating said slurry from other constituents;

holding means to contain said slurry;

agitating means to maintain said slurry in suspension and prevent settling;

circulating means in the form of a loop adapted to carry said slurry from said holding means to a point near where concrete mixers are located and back into said holding means; and conduit and valve means in communication with said loop near said mixers adapted to periodically open said loop and supply said slurry to said mixers.

9. The apparatus as claimed in claim 8, wherein said holding means comprising first and second vessels, and additionally comprising:

means passing said slurry from said separating means into said first vessel;

means passing overflow from said first vessel into said second vessel; and pump and conduit means adapted to supply partially clarified water from said second vessel as wash water for said mixers.

10. The apparatus as claimed in claim 9, and additionally comprising means for supplying make-up water to said vessels.

11. The apparatus as claimed in claim 9, wherein said first vessel only is agitated and additionally comprising pump means adapted to pump slurry from the bottom of said second vessel into said first vessel.

12. The apparatus as claimed in claim 8 wherein said valve means comprise a first valve in said loop downstream from said conduit, and a second valve in said conduit.

13. The apparatus as claimed in claim 12, and additionally comprising high-pressure flushing means in communication with said conduit.

14. The apparatus as claimed in claim 13 wherein said flushing means comprises:

forward flushing means adapted to flush said second valve through to said mixer;

back flushing means adapted to flush back to said loop and maintain a water block therebetween when said second valve is closed.

15. The apparatus as claimed in claim 8, and additionally comprising sensor means in said conduit adapted to meter the flow of slurry therethrough.

* * * * *